US009557995B2

(12) United States Patent
Eyole-Monono et al.

(10) Patent No.: US 9,557,995 B2
(45) Date of Patent: Jan. 31, 2017

(54) DATA PROCESSING APPARATUS AND METHOD FOR PERFORMING SEGMENTED OPERATIONS

(71) Applicant: ARM LIMITED, Cambridge (GB)

(72) Inventors: Mbou Eyole-Monono, Ely (CM); Alastair David Reid, Fulbourn (GB); Matthias Lothar Böttcher, Cambridge (GB); Giacomo Gabrielli, Cambridge (GB)

(73) Assignee: ARM Limited, Cambridge (GB)

(*) Notice: Subject to any disclaimer, the term of this patent is extended or adjusted under 35 U.S.C. 154(b) by 535 days.

(21) Appl. No.: 14/175,268

(22) Filed: Feb. 7, 2014

(65) Prior Publication Data

US 2015/0227367 A1   Aug. 13, 2015

(51) Int. Cl.
G06F 9/00       (2006.01)
G06F 9/30       (2006.01)
G06F 9/38       (2006.01)

(52) U.S. Cl.
CPC ....... *G06F 9/30036* (2013.01); *G06F 9/30014* (2013.01); *G06F 9/30072* (2013.01);
(Continued)

(58) Field of Classification Search
CPC .......................... G06F 9/30036; G06F 9/3891
See application file for complete search history.

(56) References Cited

U.S. PATENT DOCUMENTS 7,877,573 B1   1/2011  Le Grand
8,243,083 B1   8/2012  Garland et al.
(Continued)

OTHER PUBLICATIONS

International Search Report and Written Opinion of the International Searching Authority issued Mar. 27, 2015 in PCT/GB2015/050132, 8 pages.
(Continued)

*Primary Examiner* — Zachary K Huson
(74) *Attorney, Agent, or Firm* — Nixon & Vanderhye P.C.

(57) ABSTRACT

A data processing apparatus and method are provided for performing segmented operations. The data processing apparatus comprises a vector register store for storing vector operands, and vector processing circuitry providing N lanes of parallel processing, and arranged to perform a segmented operation on up to N data elements provided by a specified vector operand, each data element being allocated to one of the N lanes. The up to N data elements forms a plurality of segments, and performance of the segmented operation comprises performing a separate operation on the data elements of each segment, the separate operation involving interaction between the lanes containing the data elements of the associated segment. Predicate generation circuitry is responsive to a compute descriptor instruction specifying an input vector operand comprising a plurality of segment descriptors, to generate per lane predicate information used by the vector processing circuitry when performing the segmented operation to maintain a boundary between each of the plurality of segments. As a result, interaction between lanes containing data elements from different segments is prevented. This allows very effective utilisation of the lanes of parallel processing within the vector processing circuitry to be achieved.

27 Claims, 13 Drawing Sheets

(52) U.S. Cl.
CPC ...... *G06F 9/30076* (2013.01); *G06F 9/30098* (2013.01); *G06F 9/3887* (2013.01); *G06F 9/3891* (2013.01)

(56) References Cited

U.S. PATENT DOCUMENTS

| | | | | |
|---|---|---|---|---|
| 2011/0307685 | A1* | 12/2011 | Song | G06F 17/10 712/16 |
| 2012/0113133 | A1* | 5/2012 | Shpigelblat | G06F 9/30036 345/619 |
| 2012/0191950 | A1* | 7/2012 | Gonion | G06F 9/30072 712/214 |
| 2012/0210081 | A1 | 8/2012 | Fossum | |
| 2013/0124823 | A1 | 5/2013 | Cavin | |

OTHER PUBLICATIONS

M. Abrash, "A First Look at the Larrabee New Instructions (LRBni)", Dr. Dobb's, The World of Software Development, CUDA Fortran, http://drdobbs.com/high-performance-computing/216402188, Apr. 1, 2009, 17 pages.

S. Sengupta, "Efficient Primitives and Algorithms for Many-Core Architectures", Dissertation, 2010, 164 pages.

M. Billeter et al., "Efficient Stream Compaction on Wide SIMD Many-Core Architectures", HPG 2009, Aug. 1-3, 2009, pp. 159-166.

G. Blelloch et al., "Implementation of a Portable Nested Data-Parallel Language", Journal of Parallel and Distributed Computing, vol. 21, pp. 4-14, 1994.

N. Bell et al., "Implementing Sparse Matrix-Vector Multiplication on Throughout-Oriented Processors", ACM, 2009, 11 pages.

G. Blelloch et al., "Segmented Operations for Sparse Matrix Computation on Vector Multiprocessors", School of Computer Science, Carnegie Mellon University, Aug. 1993, CMU-CS-93-173, 26 pages.

B. Ren et al., "SIMD Parallelization of Applications That Traverse Irregular Data Structures", CGO'13, Feb. 23-27, 2013, 2013 IEEE, 10 pages.

Prins et al., "Transforming High-Level Data-Parallel Programs Into Vector Operations", Department of Computer Science, University of North Carolina, 13 pages.

G. Blelloch et al., "VCODE: A Data-Parallel Intermediate Language", School of Computer Science, Carnegie Mellon University, 18 pages.

* cited by examiner

Compute Descriptor Instruction

DATA PROCESSING APPARATUS AND METHOD FOR PERFORMING SEGMENTED OPERATIONS

BACKGROUND OF THE INVENTION

Field of the Invention

The present invention relates to a data processing apparatus and method for performing segmented operations.

Description of the Prior Art

One known technique for improving performance of a data processing apparatus is to provide circuitry to support execution of vector operations. Vector operations are performed on at least one vector operand, where each vector operand comprises a plurality of data elements. Performance of the vector operation then involves applying an operation repetitively across the various data elements within the vector operand(s).

In typical data processing systems that support performance of vector operations, a vector register file will be provided for storing the vector operands. Hence, by way of example, each vector register within a vector register file may store a vector operand comprising a plurality of data elements.

In certain implementations, it is also known to provide vector processing circuitry (often referred to as SIMD (Single Instruction Multiple Data) processing circuitry) which provides multiple lanes of parallel processing in order to perform operations in parallel on the various data elements within the vector operands.

Through the use of vector operations, significant performance benefits can be realised when compared with the performance of an equivalent series of scalar operations.

For certain types of operations which can be vectorised to enable them to be executed in parallel within the various lanes of the vector processing circuitry, it is difficult to obtain efficient utilisation of the vector processing circuitry. For example, there are often operations which are performed on each iteration of a loop, but within each iteration the number of data elements to be processed by those operations can vary, such that there is a lack of regularity in the number of data elements to be processed in each iteration. Whilst for each iteration the various data elements may be able to be processed within respective lanes of the vector processing circuitry, this will not always lead to good utilisation of the available lanes of the vector processing circuitry. For example, if the vector processing circuitry has N lanes of parallel processing, it may often be the case that less than N data elements are processed in respect of several of the iterations, leading to inefficient utilisation of the vector processing circuitry. Further, due to the irregular nature of the data elements for each iteration, it has up to now been considered impractical to make more efficient use of the vector processing circuitry since it is unclear exactly how many lanes will be required on any particular iteration.

One example of an algorithm where such irregular numbers of data elements need to be processed is a sparse matrix multiplication algorithm, where a sparse matrix of first data elements is multiplied by a vector of second data elements in order to produce a number of multiplication results for each row of the sparse matrix. The multiplication results within each row are then accumulated in order to produce a result for each row. However, the number of multiplication results produced for each row is dependent on the number of non-zero data elements in each row of the sparse matrix, and hence the number of multiplication results can vary quite significantly between the various rows. Whilst the accumulation operation required to accumulate the multiplication results for any particular row lends itself to being performed using lanes of the vector processing circuitry, the number of lanes required for any particular iteration will vary, and this will tend to result in significant underutilisation of the vector processing circuitry, which will affect both performance and the energy consumption of the vector processing circuitry when performing those operations.

Recent attempts at solving irregular problems such as sparse matrix vector multiplication have focused on using throughput-oriented processors or graphics processing units (GPUs). Whilst GPUs are very good at overlapping computation with memory accesses and thus hiding latency, they experience difficulties when the irregularity of the data structures manifest as computational load imbalances. As a result, the efforts are only successful when special data formats are used or the underlying physical problem being modelled produces a well structured sparse matrix for example.

The following are examples of various papers that describe techniques for handling irregular data structures:

1. Shubhabrata Sengupta, Efficient Primitives and Algorithms for Many-core architectures, PhD Thesis, 2010.

2. G. E. Blelloch, J. C. Hardwick, J. Sipelstein, M. Zagha, S. Chatterjee, Implementation of a Portable Nested Data-Parallel Language, Journal of Parallel and Distributed Computing, Volume 21, Issue 1, April 1994.

3. B. Ren, G. Agrawal, J. R. Larus, T. Mytkowicz, T. Poutanen, W. Schulte, SIMD Parallelization of Applications that Traverse Irregular Data Structures, 2013.

4. M. Billeter, O. Olsson, U. Assarsson, Proceedings of the Conference on High Performance Graphics 2009, Efficient Stream Compaction on Wide SIMD Many-Core Architectures.

It would be desirable to provide a mechanism for improving the utilisation of vector processing circuitry, that would enable better utilisation of the lanes of parallel processing when handling a variety of sets of data, for example the earlier described irregular data structures.

SUMMARY OF THE INVENTION

Viewed from a first aspect, the present invention provides a data processing apparatus comprising: a vector register store configured to store vector operands; vector processing circuitry providing N lanes of parallel processing, and configured to perform a segmented operation on up to N data elements provided by a specified vector operand, each data element being allocated to one of said N lanes, said up to N data elements forming a plurality of segments, and performance of the segmented operation comprising performing a separate operation on the data elements of each segment, said separate operation involving interaction between the lanes containing the data elements of the associated segment; and predicate generation circuitry configured to be responsive to a compute descriptor instruction specifying an input vector operand comprising a plurality of segment descriptors, to generate per lane predicate information used by the vector processing circuitry when performing said segmented operation to maintain a boundary between each of said plurality of segments, in order to prevent interaction between lanes containing data elements from different segments.

In accordance with the present invention, predicate generation circuitry is responsive to a compute descriptor instruction to generate, having regard to an input plurality of segment descriptors, per lane predicate information. The vector processing circuitry is then arranged to perform a segmented operation on up to N data elements (where N is the number of lanes of parallel processing), where those data elements form more than one segment. The per lane predicate information is used to maintain a boundary between each of those segments, such that performance of the segmented operation enables a separate operation to be performed on the data elements of each segment whilst preventing interaction between the lanes that contain data elements from different segments.

The segmented operation will typically generate results that represent application of a sequence of operations to the data elements, such as A, A+B, A+B+C, A+B+C+D (where A, B, C and D are data elements allocated to separate lanes). While the order that the elements are computed in is irrelevant (assuming associativity), the resulting vector represents a mathematical sequence based on the order of the input elements. Without the per lane predicate information the mathematical sequence would be applied across the full set of up to N data elements, but by virtue of the per lane predicate information a boundary between adjacent segments is maintained, such that within each segment a separate mathematical sequence is generated.

In one embodiment, the separate operation performed for each segment is essentially the same operation, which is performed separately within each segment by virtue of each boundary maintained using the per lane predicate information. The "interaction between the lanes" that occurs as part of the separate operation performed on each segment typically involves binary operations involving elements provided by at least two different lanes. Such operations may involve computations, data movements (e.g. min/max) or substitutions (e.g. saturating add/sub), etc. The per lane predicate information prevents such interaction between adjacent lanes at a segment boundary.

In accordance with the technique of the present invention, it is not necessary to process the segments individually via one or more iterations through the vector processing circuitry, but instead more effective utilisation of the N lanes of parallel processing can be achieved by allowing a single iteration through the vector processing circuitry to operate on data elements from multiple segments. This is possible due to the execution of the compute descriptor instruction producing per lane predicate information that enables a boundary between the multiple segments to be maintained.

Such an approach can produce both performance improvements and energy consumption savings when performing a wide variety of different operations. It is particularly well suited to enabling more effective utilisation of the vector processing circuitry when processing a data structure consisting of multiple segments, where the number of data elements in each segment is irregular.

In one embodiment, the vector processing circuitry comprises multiple pipelined stages, and is configured to employ the per lane predicate information to control computations performed in each of the multiple pipelined stages in order to maintain the boundary between each of said plurality of segments. Hence, in such embodiments, the per lane predicate information is used to manage the computations performed in each pipelined stage so as to prevent any interaction between lanes containing data elements from different segments.

In one embodiment, at each pipelined stage the vector processing circuitry is configured to selectively disable one or more computations in dependence on said per lane predicate information in order to prevent interaction between lanes containing data elements from different segments. Hence, in one embodiment, the vector processing circuitry may include circuit elements that enable it to perform a non-segmented version of the operation across N data elements allocated to the N lanes of parallel processing, but through use of the per lane predicate information, one or more of the computations that would be performed in the non-segmented version of the operation are disabled to enable the operation to be performed in a segmented manner on the data elements within each segment.

The way in which the per lane predicate information is used by the vector processing circuitry can vary dependent on embodiment. However, in one embodiment, for each of one or more of the pipelined stages, the vector processing circuitry is configured to perform a logical operation on the per lane predicate information in order to produce control data to identify which computations are to be disabled at that pipelined stage. In one particular embodiment, the per lane predicate information generated by the predicate generation circuitry is used "as is" in a first iteration, but for subsequent iterations it is logically ORed with a shifted version of the per lane predicate information in order to produce the required control data for such subsequent iterations.

The per lane predicate information can take a variety of forms. In one embodiment, it comprises a binary value for each lane. In one particular arrangement, the binary value is set to a first value to identify each lane into which a final data element of a segment is allocated, and is set to a second value for all other lanes. Hence, by way of example, the first value may be a logic one value, and the second value may be a logic zero value, such that each occurrence of a logic one value within the per lane predicate information identifies a lane whose allocated data element marks the end of a segment. Hence, the first value is effectively used as a pointer to identify the end of each segment within the N lanes of parallel processing.

However, there is no requirement for the per lane predicate information to be specified in such a way. For example, in an alternative embodiment, the binary value is set to a first value to identify lanes containing data elements of one segment, and is set to a second value to identify lanes containing data elements of an adjacent segment. Hence, the per lane predicate information alternates between a series of first values and a series of second values to identify each of the segments within the N lanes of parallel processing. If more than two segments are identified, then each adjacent segment will be marked by a transition in the binary value. For each segment, the number of binary values at the same value identify the total number of data elements in the segment.

In one embodiment, it is possible for segments to be defined having no data elements. In one embodiment, such segments cannot effectively be identified by the per lane predicate information. Instead, in one embodiment, the predicate generation circuitry is further configured to set a control field if the plurality of segment descriptors indicates presence of at least one segment having no data elements. There are a number of ways in which the control field can be set. For example, a flag may be set to identify the presence of at least one segment having no data elements, or a value could be stored in a CPU general purpose register.

How the vector processing circuitry then responds to the setting of the control field can vary dependent on embodiment. Indeed, in some embodiments, it may not be necessary for the vector processing circuitry to take any action in response to the setting of the control field. However, in one embodiment the vector processing circuitry is responsive to the control field being set to perform an additional processing step in association with the segmented operation.

In one particular embodiment, the additional processing step comprises identifying from the plurality of segment descriptors a location of each segment having no data elements, and inserting a predetermined data value at that location within result data generated by the segmented operation.

In embodiments where the control field is implemented by a flag, the flag may be a dedicated flag provided purely for the purpose of indicating the presence of at least one segment having no data elements. Alternatively, a pre-existing flag, for example a carry flag, may be used rather than requiring a separate dedicated flag to be provided. Further, additional flags could be used to carry sideband information such as the position of zero-length segments.

Whilst in one embodiment the segmented operation may take as input data only the data elements of the specified vector operand, in an alternative embodiment the segmented operation may further specify a scalar carry-in value, and performance of the segmented operation produces a vector of result data elements and a scalar carry-out value. Hence, the scalar carry-in value will be incorporated into the computations performed within the vector processing circuitry on the data elements provided by the specified vector operand, for example by propagating that scalar-carry in value to each of the lanes associated with the first segment at an appropriate point during performance of the segmented operation. In addition to producing a vector of result data elements, there will also be produced a scalar carry-out value. In some situations, it may be that the scalar carry-out value is set to a neutral value used to identify that there is no carry-out value.

However, in alternative embodiments, the carry-out value can be used as a carry-in value for another iteration of the process. In particular, in one embodiment, the vector processing circuitry is responsive to a segmented instruction to perform the segmented operation, and the data processing apparatus is configured to execute a plurality of iterations of the compute descriptor instruction and the segmented instruction to perform the segmented operation on a set of data elements comprising more than N data elements, the scalar carry-out value produced by performance of the segmented operation for one iteration being used as the scalar carry-in value for performance of the segmented operation in a next iteration. This hence enables a large data set to be operated on whilst making more effective utilisation of the vector processing circuitry resources during the performance of all of the required iterations. If segments span more than one iteration, then the scalar carry-out value produced at the end of one iteration can be used as a scalar carry-in value for the next iteration, to allow propagation of the appropriate value into the next iteration to enable the continued performance of the operation in respect of the data elements of the segment.

In such an arrangement, effective utilisation of the vector processing circuitry is achieved even where the number of data elements in each of the segments is irregular.

In one embodiment, the segments identify data elements associated with each iteration of a predetermined loop within a nested loop. The predetermined loop may for example be the inner loop of a nested loop.

In one embodiment, the vector processing circuitry is configured to perform a sparse matrix multiplication operation where a sparse matrix of first data elements is multiplied by a vector of second vector elements to produce a number of multiplication results for each row of the sparse matrix, said multiplication results forming said set of data elements upon which the segmented operation is performed, where each segment comprises the multiplication results for one of the rows of the sparse matrix. This represents a particular example scenario where the number of data elements provided in each segment is likely to be irregular.

The segmented operation can take a variety of forms, but in one embodiment performs an accumulation operation on the multiplication results within each segment.

The segment descriptors provided as an input to the compute descriptor instruction can take a variety of forms. In one embodiment, the segment descriptors provide a pointer to either an end of each segment or a beginning of each segment, whilst in an alternative embodiment the segment descriptors identify a length of each segment. When the segment descriptors identify a length of each segment, then the end of a current segment could be calculated based on an offset relative to the previous segment.

The segment descriptors may be provided by any suitable data type. In one embodiment they comprise signed integers, in one particular embodiment each segment descriptor being represented by a 32-bit signed integer.

In one embodiment where such signed integers are used as the segment descriptors, then on each iteration of the compute descriptor instruction and the segmented instruction, the input vector operand is updated to remove any segment descriptors used during a preceding iteration to generate the per lane predicate information for the preceding iteration. This ensures that used segment descriptors are discarded, and not reconsidered during a later iteration.

In one embodiment, the predicate generation circuitry is configured, prior to generating the per lane predicate information for a current iteration, to subtract from the plurality of segment descriptors provided for the current iteration, a value equal to the total number of data elements processed by all preceding iterations. In one particular embodiment, N data elements will be processed in each iteration, other than the final iteration, and accordingly a multiple of N is subtracted from the plurality of segment descriptors in order to generate revised segment descriptors that are then used to generate the per lane predicate information. This allows the segment descriptors to be mapped into the relevant lanes of parallel processing for the current iteration, in order to identify any segment boundaries present in that current iteration.

The segmented operation can take a variety of forms, but in one embodiment is either a segmented scan operation or a segmented reduction operation. In accordance with a scan operation, an identified binary operation is applied repetitively to an increasing number of data elements. The binary operation can take a variety of forms, for example an add operation, multiply operation, minimum detection operation, maximum detection operation, etc. As a result of performance of the scan operation, a vector containing a sequence of results is generated, each result relating to the application of the binary operation to a different number of the data elements. As a particular example, the scan operation may specify an add operation as the binary operation, such a scan add operation sometimes being referred to as a prefix sum operation.

A reduction operation is similar to a scan operation, but only the final scan result is retained as an output (and accordingly the intervening scan results need not be retained, and in some embodiments need not be computed).

There are a number of ways in which the per lane predicate information generated by the predicate generation circuitry can be retained for subsequent use by the vector processing circuitry during performance of the segmented operation. In one embodiment, a dedicated register may be provided for storing the per lane predicate information. However, in an alternative embodiment, the apparatus further comprises a predicate register file providing a plurality of predicate registers, and the compute descriptor instruction is configured to specify one of the predicate registers into which the per lane predicate information is to be stored. Hence, the particular predicate register used can be identified directly in the compute descriptor instruction.

Viewed from a second aspect, the present invention provides a method of performing segmented operations within a data processing apparatus having a vector register store configured to store vector operands, and vector processing circuitry providing N lanes of parallel processing, the method comprising: performing within the vector processing circuitry a segmented operation on up to N data elements provided by a specified vector operand, each data element being allocated to one of said N lanes, said up to N data elements forming a plurality of segments, and performance of the segmented operation comprising performing a separate operation on the data elements of each segment, said separate operation involving interaction between the lanes containing the data elements of the associated segment; and responsive to a compute descriptor instruction specifying an input vector operand comprising a plurality of segment descriptors, generating per lane predicate information used by the vector processing circuitry when performing said segmented operation to maintain a boundary between each of said plurality of segments, in order to prevent interaction between lanes containing data elements from different segments.

Viewed from a third aspect, the present invention provides a data processing apparatus comprising: a vector register store means for storing vector operands; vector processing means for providing N lanes of parallel processing, and for performing a segmented operation on up to N data elements provided by a specified vector operand, each data element being allocated to one of said N lanes, said up to N data elements forming a plurality of segments, and performance of the segmented operation comprising performing a separate operation on the data elements of each segment, said separate operation involving interaction between the lanes containing the data elements of the associated segment; and predicate generation means for generating, in response to a compute descriptor instruction specifying an input vector operand comprising a plurality of segment descriptors, per lane predicate information used by the vector processing means when performing said segmented operation to maintain a boundary between each of said plurality of segments, in order to prevent interaction between lanes containing data elements from different segments.

Viewed from a fourth aspect the present invention provides a computer program product storing in a non-transitory form a computer program for controlling a computer to provide a virtual machine execution environment for program instructions corresponding to a data processing apparatus in accordance with the first aspect of the present invention.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
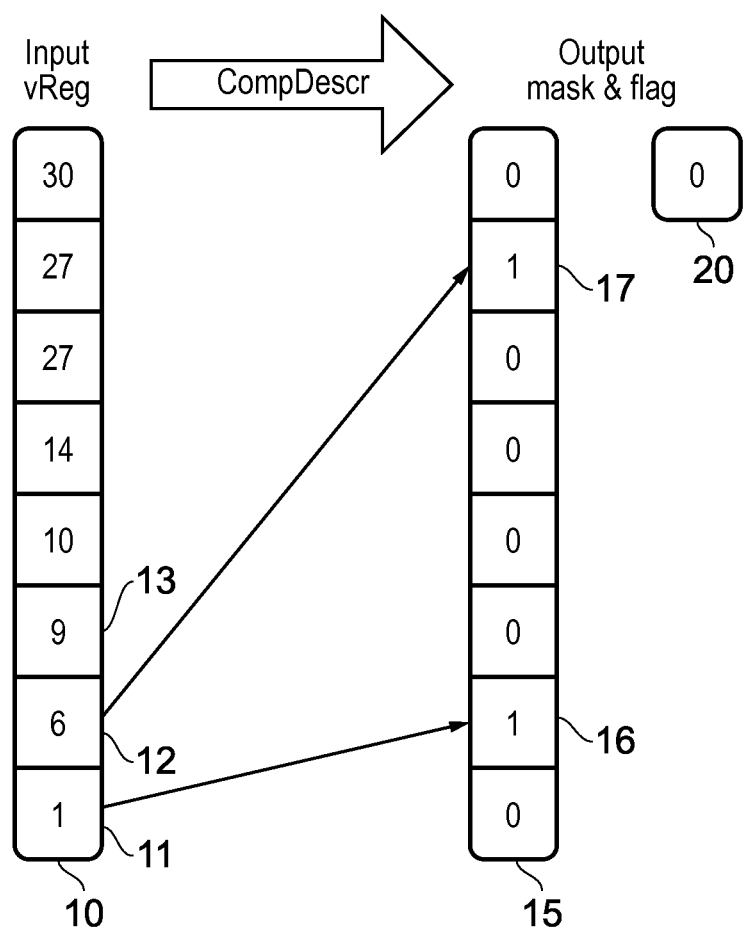
FIG. 1 schematically illustrates how per lane predicate information is generated by execution of a compute descriptor instruction specifying an input vector operand, in accordance with one embodiment.

FIG. 1 schematically illustrates the performance of a compute descriptor operation in accordance with one embodiment. In particular, in one embodiment, predicate generation circuitry within a data processing apparatus is configured to be responsive to a compute descriptor instruction specifying an input vector operand 10 comprising a plurality of segment descriptors, to generate per lane predicate information 15 which is then used by vector processing circuitry of the data processing apparatus to perform a segmented operation. In one embodiment, as shown in FIG. 1, the input vector register 10 contains a series of unsigned data values, in one particular embodiment, the input vector register contains a series of eight 32-bit unsigned values. Each of the unsigned values in this embodiment represents the end of segment.

In this example, it is assumed that the vector processing circuitry provides eight lanes of parallel processing, and hence can perform a segmented operation on a sequence of up to eight data elements in any particular iteration. Typically, the segmented operation will be performed in response to a segmented instruction specifying a particular input vector operand of data elements, with each data element being allocated to one of the lanes of parallel processing within the vector processing circuitry.

Returning to the discussion of the input vector operand for the compute descriptor instruction, specifying a series of 32-bit unsigned values, then the first unsigned value 11 has a value of 1, indicating that the first segment ends at data element position 1. This hence causes the second bit 16 of the per lane predicate information 15 (also referred to herein as a mask) to be set equal to 1. Similarly, the second 32-bit unsigned value 12 in the input operand 10 has a value of 6, indicating that the next segment ends at data element position 6. This accordingly causes the bit 17 within the mask 15 to be set equal to 1. However, the next unsigned value 13 has a value greater than 8 (in this case a value of 9), and hence lies outside of the range of the number of data elements that can be processed by the vector processing circuitry in a single iteration. Accordingly, the third and higher unsigned values in the input operand 10 are ignored for the current iteration. Within the mask, any bit positions that have not been set equal to a logic one value by virtue of the contents of the input operand 10 have their values set equal to 0, as shown in FIG. 1. Further unsigned values within the input operand 10 can be used in subsequent iterations, as will be discussed for example in more detail with reference to FIG. 7.

In addition to the mask 15, in one embodiment execution of the compute descriptor instruction will also manipulate the value of a flag 20. The state of the flag indicates if two consecutive unsigned values within the input operand register 10 have the same value, this indicating the presence of a segment having no data elements. In one embodiment, the flag is set to a logic one value if two consecutive elements within the input vector register 10 are equivalent, but otherwise is cleared to a logic zero value. Accordingly, in the example of FIG. 1, the flag 20 will be cleared to a logic zero value. Whilst in some embodiments the algorithms/programmer may decide to ignore this flag, in one embodiment it is used to identify input vectors that require separate treatment, as will be discussed later, for example, with reference to FIG. 4B.

Figure 2:
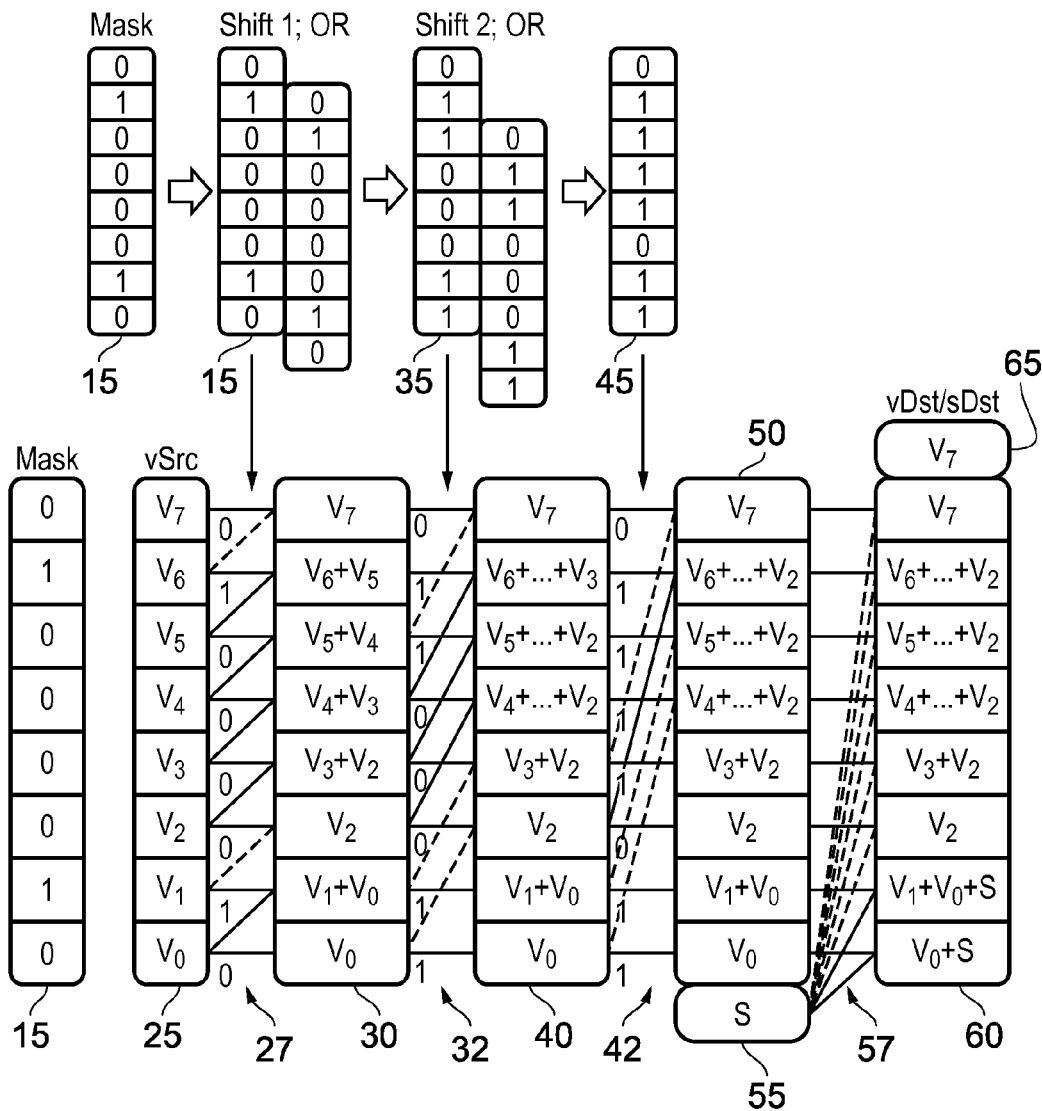
FIG. 2 schematically illustrates how the per lane predicate information is used to perform a segmented scan operation in accordance with one embodiment.

FIG. 2 is a diagram schematically illustrating the performance of a segmented scan operation within vector processing circuitry in accordance with one embodiment, using the mask 15 generated in FIG. 1. In this example, the scan operation specifies as its binary operation an add operation. Considering an input sequence of values $x_0$, $x_1$, $x_2$ . . . application of the scan add will produce a sequence of results $y_0$, $y_1$, $y_2$, . . . , where:

$y_0 = x_0$
$y_1 = x_0 + x_1$
$y_2 = x_0 + x_1 + x_2$
. . .

In the example illustrated in FIG. 2, an input source vector operand 25 contains the eight data elements $v_0$ to $v_7$. Without any segmentation, it will be understood that performance of a scan add operation on those eight data elements will cause the add operation to be applied repetitively across each of the eight lanes of parallel processing of the vector processing circuitry, with the add operation being performed on an increasing number of data elements within each of the lanes, such that for the final lane containing the input data element $v_7$, the result produced will represent the addition of all eight of the data elements $v_0$ to $v_7$.

However, in accordance with the described embodiments, the operation of the vector processing circuitry is modified by provision of the mask 15, in particular each of the logic one values in the mask identifying the end of a segment. Accordingly, the first segment comprises the vector elements $v_0$ and $v_1$, whilst a second segment then contains the vector elements $v_2$, $v_3$, $v_4$, $v_5$ and $v_6$. The final vector element $v_7$ is contained within a third segment, that third segment not terminating within the vector length of eight represented by the input vector operand 25.

As shown in FIG. 2, the performance of the segmented scan operation takes place in four discrete parts 27, 32, 42 and 57. For the first part 27, the input mask 15 is used so as to disable the computations indicated by the two dotted lines within the part 27. Accordingly, performance of the remaining add operations transforms the input vector 25 into the intermediate form 30.

For the next part of the scan operation 32, a modified mask is performed by logically ORing the mask with a one bit shifted version of itself in order to produce the new mask 35. The new mask 35 then disables the three operations indicated by dotted lines in the second part 32 of the scan operation, and as a result performance of the remaining add operations produces the intermediate vector 40.

For the third part 42 of the scan operation, a further modified mask 45 is produced by logically ORing the mask 35 with a two bit shifted version of itself. This disables the three computations indicated by the dotted lines in the third part 42, and results in the intermediate vector 50 being produced.

The final part 57 of the scan operation involves adding a scalar input to the data elements in each of the lanes of the first segment. In this case, the first segment only includes the data elements in lanes 0 and 1, and accordingly the scalar operand 55 is not propagated to any of the other lanes. This produces the result vector 60. In addition, since lane 7 contains the vector element $v_7$, which is part of a third segment which has not terminated, then the vector element $v_7$ is output as a carry-out scalar value 65. The scalar carry-out value 65 can then be used as a scalar carry-in value for a next iteration of the segmented scan, and for any such subsequent iteration a new mask will be generated by a further performance of the compute descriptor instruction based on a modified input vector operand that excludes the already consumed descriptor values "1" and "6". The process of generating masks for subsequent iterations of the segmented scan process will be described later with reference to FIG. 7.

Figure 3:
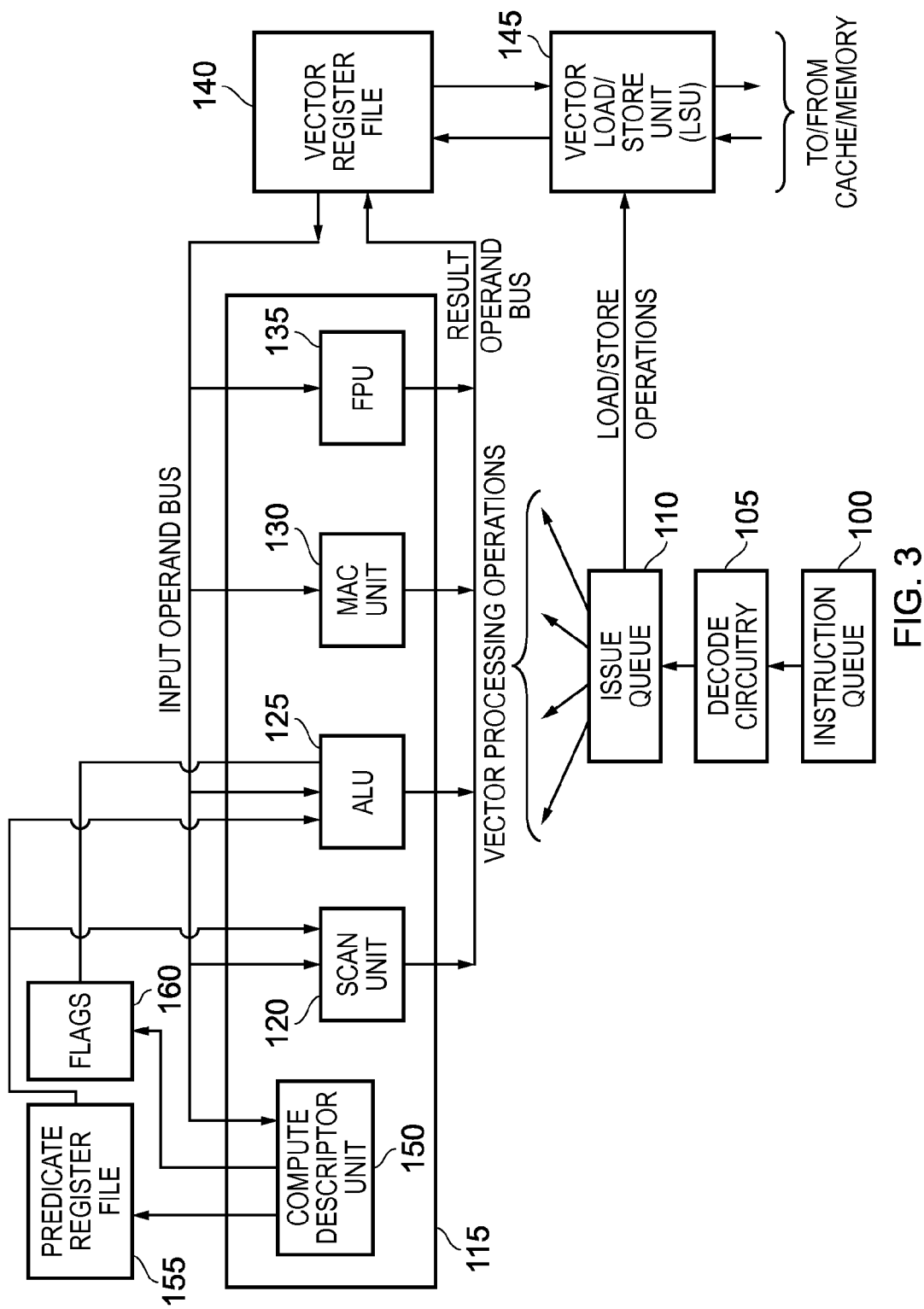
FIG. 3 is a block diagram of a data processing apparatus in accordance with one embodiment.

FIG. 3 illustrates a data processing apparatus in accordance with one embodiment. Instructions to be executed by the apparatus are placed within an instruction queue 100 from where they are passed to decode circuitry 105. The decode circuitry decodes the instructions in order to generate certain control information placed within the issue queue 110, such control information sometimes being referred to as micro-ops. The issue queue will then dispatch appropriate control information to the relevant processing units within the apparatus in order to cause the operations specified by the received instructions to be performed.

In the example shown, a plurality of vector processing units 115 are provided, these including a scan unit 120, an arithmetic logic unit (ALU) 125, a multiply accumulate (MAC) unit 130, a floating point unit (FPU) 135 and a compute descriptor unit 150. Accordingly, floating point operations identified in the issue queue 110 will be forwarded to the FPU 135 for handling, multiplication and/or multiply accumulate operations will be passed to the MAC unit 130, and standard arithmetic operations will be passed to the ALU 125. The scan unit 120 may itself be formed by another arithmetic logic unit, or can be a dedicated unit provided for performing the scan operations of the described embodiments. In one embodiment the scan unit 120 may be used in combination with the ALU 125 in order to perform the required segmented scan operations, with a forwarding path being used between the scan unit 120 and the ALU 125. Hence, for example, the ALU may be used to perform the final part 57 of the scan operation, where a scalar value is added to the vector elements in a number of the lanes (the number being dependent on where the first segment boundary is within the lanes of parallel processing for the iteration being performed).

The compute descriptor unit 150 is used to execute the earlier-discussed compute descriptor instructions, and in one embodiment is arranged to store the resultant mask in one of the predicate registers within the predicate register file 155. The predicate register may be predetermined, or alternatively may be identified within a field of the compute descriptor instruction. Where execution of the compute descriptor instruction also manipulates a flag, then the compute descriptor unit 150 will have write access to the flags 160. The scan unit 120 (and optionally the ALU 125) will then have access to the predicate register file 155 and the flags 160 when performing the earlier described segmented scan operations.

The various input operands required by the vector processing unit 115 will be read from registers within the vector register file 140. In addition, result operands generated by each of the units (other than the compute descriptor unit whose output is stored in the predicate register file) will typically be stored back to destination registers within the vector register file 140. Load and store instructions will be used to cause corresponding load and store operations to be performed by the vector load/store unit (LSU) 145 in order to cause operand data to be loaded from memory into specified registers of the vector register file 140, or for the current contents of one or more of the vector registers to be stored back to memory.

Figure 4A:
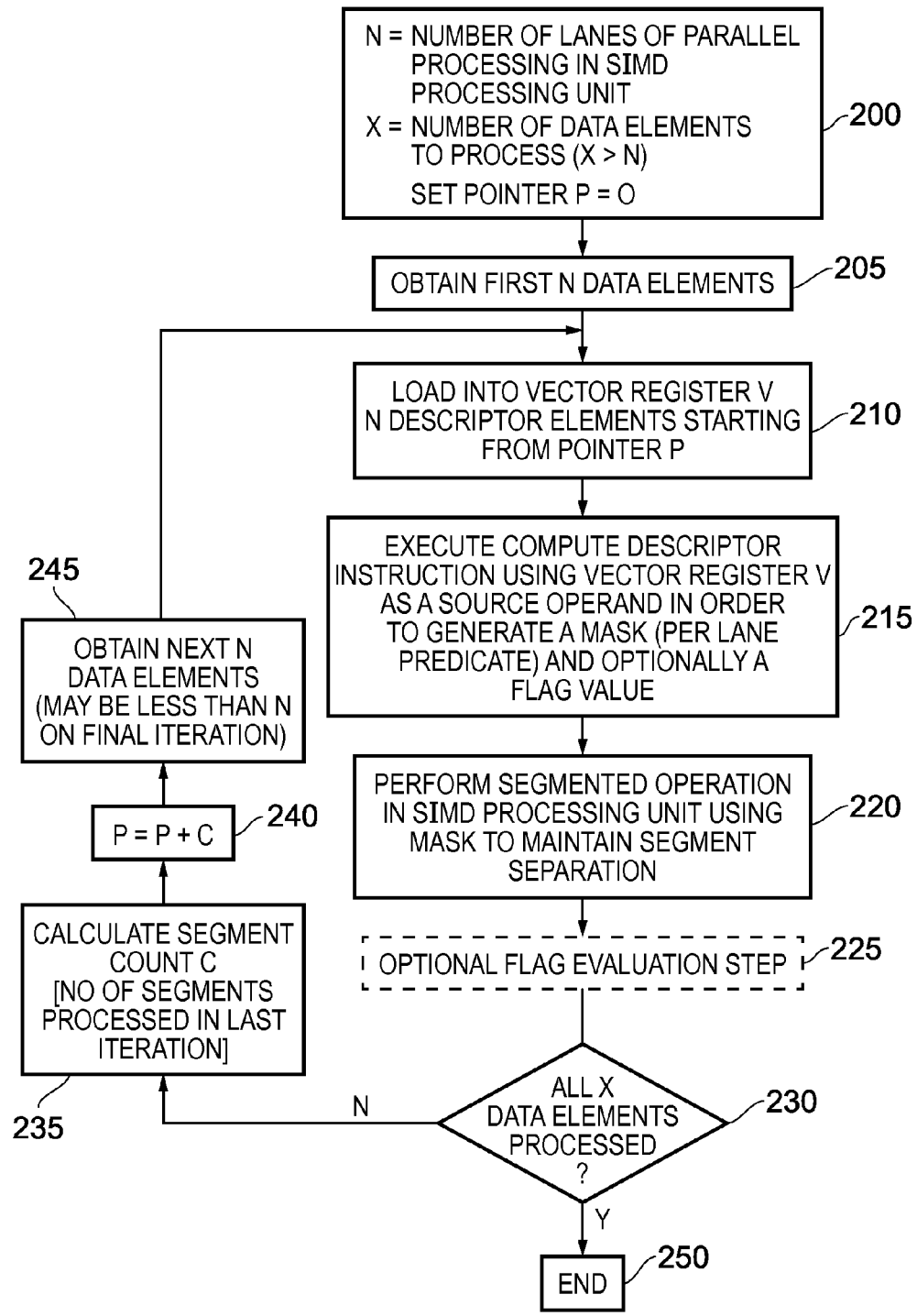
FIG. 4A is a flow diagram illustrating how a set of data elements are subjected to a segmented operation using the apparatus of FIG. 3, in accordance with one embodiment.

FIG. 4A is a flow diagram illustrating how the data processing apparatus of FIG. 3 is arranged to perform a segmented scan operation on a set of data elements by executing of plurality of iterations of the compute descriptor instruction and an associated segmented scan instruction, in accordance with one embodiment. As indicated by step 200 at FIG. 4A, the parameter N indicates the number of lanes of parallel processing in the SIMD processing unit used to perform the segmented scan operation. In the example of FIG. 3, this SIMD processing unit will take the form of the scan unit 120, although in an alternative embodiment the scan unit may be used in combination with the ALU 125 in order to perform the segmented scan operation, for example by delegating the final part 57 of the scan operation to the ALU 125. In one particular embodiment, such as that shown in FIG. 2, N will be equal to 8.

As also shown in step 200 of FIG. 4A, the parameter X identifies the total number of data elements in the set of data elements to be processed. In this example, it is assumed that X is greater than N, and accordingly multiple iterations through the scan unit will need to be performed in order to process all of the data elements. Finally, at step 200, a pointer P is set equal to 0.

At step 205, the first N data elements are obtained. This will typically occur by those N data elements being stored in one of the vector registers of the vector register file 140, prior to that vector operand being specified as an input operand for a segmented scan instruction.

At step 210, N descriptor elements starting from the pointer P are loaded into a vector register V. In one embodiment, the vector register V is one of the vector registers within the vector register file 140 and will be specified as an input operand for a compute descriptor instruction. As discussed earlier with reference to FIG. 1, each of the descriptor elements in one embodiment takes the form of a 32-bit signed value.

Following step 210, a compute descriptor instruction is executed within the compute descriptor unit 150 using the vector register V as a source operand, in order to generate a mask and optionally a flag value, as discussed earlier with reference to FIG. 1. As will be apparent later from the discussion of FIG. 7, prior to using the descriptor elements within the vector register V, a value equal to the total number of data elements processed by any preceding iterations of the segmented scan process is subtracted from the descriptor elements. Accordingly, on a first iteration, no data elements would have been processed, and accordingly the descriptor elements are used unamended. Assuming a vector length of eight (i.e. where there are eight lanes of parallel processing in the SIMD unit), and on each previous iteration eight data elements are processed within those lanes of parallel processing, then in a second iteration a value of 8 will be subtracted from the input descriptor elements, in a third iteration a value of 16 will be subtracted from the descriptor elements, etc. Based on the modified descriptor elements, the mask is generated using the approach discussed earlier with reference to FIG. 1.

Whilst in one embodiment this subtraction process is incorporated as part of the execution of the compute descriptor instruction, it will be appreciated that in an alternative embodiment a separate instruction could be used to modify the contents of the vector register V within the vector register file 140 prior to that vector register being specified as an input operand for the compute descriptor instruction, so that once the compute descriptor instruction is executed, there is no requirement to modify the descriptor elements as specified within the input vector operand.

Following step 215, the segmented operation is performed at step 220 in the SIMD processing unit using the mask to maintain segment separation, as for example discussed earlier with reference to FIG. 2. In one embodiment, a segmented scan instruction is used to cause the scan unit 120 (and optionally the ALU 125) to perform the required scan operation, with one input of the scan instruction specifying the vector operand containing the data elements to be processed, and another input specifying the predicate register containing the mask to be used when executing the segmented scan operation.

At step 225, there is an optional flag evaluation step as will be discussed later with reference to FIG. 4B, the performance of this step depending on whether the compute descriptor instruction is used to manipulate the value of one of the flags 160 or not.

At step 230, it is then determined whether all X of the data elements have been processed, and if not, then the process proceeds to step 235 where a segment count value C is calculated. In particular, the segment count C identifies the number of segments that were processed in the iteration just completed. Considering the example of FIG. 1, it will hence be the case that for that iteration C will be set equal to 2.

Following step 235, the parameter P is incremented by the value of the segment count C. Thereafter, at step 245, the next N data elements are obtained, for example by loading those data elements into a vector register within the vector register file 140 which will then be specified as an input operand for the next segmented scan instruction. Thereafter, the process returns to step 210. At this point, the N descriptor elements that are loaded into the vector register V from the pointer P will now be dependent on the modified value of the pointer P calculated at step 240.

The above process will repeat until all of the data elements have been processed, whereafter the process will end at step 250. It should be noted that on the final iteration, it may be the case at step 245 that there are less than N data elements to be processed. In this case, the vector register into which the remaining data elements are loaded may also include some dummy data to pad out the remaining data elements of the vector operand. It is also possible to use predicate control information to disable certain lanes of parallel processing within the scan unit 120 (and ALU 125) to turn off the processing elements within the lanes that are not operating on active data.

Figure 4B:
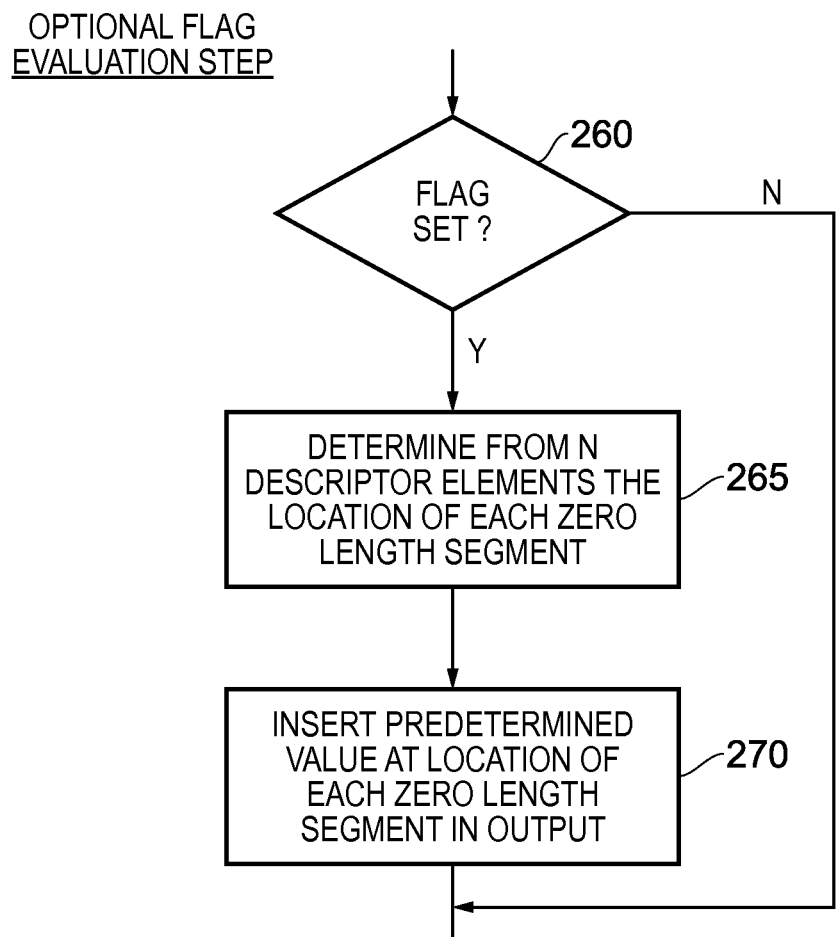
FIG. 4B illustrates in more detail the optional flag evaluation step of FIG. 4A in accordance with one embodiment.

FIG. 4B is a flow diagram illustrating the optional flag evaluation step 225 in accordance with one embodiment. At step 260, it is determined whether the flag has been set by the execution of the compute descriptor instruction at the preceding step 215. If not, no action is required. However, if the flag has been set, it is then determined, from the N descriptor elements within the vector register V for the current iteration, the location of each zero length segment. In one embodiment, each zero length segment is indicated by the presence of two consecutive descriptor elements having the same value. For any identified zero length segment, then at step 270 a predetermined value (for example a logic zero value) is inserted at the location of each zero length segment in the output of the segmented operation performed at step 220. Hence, considering the earlier example of FIGS. 1 and 2, if the input register 10 had as its first three descriptor elements the values 1, 1 and 6, then the segmented scan operation would be performed as shown in FIG. 2, but at step 270 a predetermined value would be inserted between the value produced in association with the last data element of the first segment, namely the value $v_1+v_0+s$ and the value produced for the sum of the second segment.

It will be appreciated that the predetermined value need not be a logic zero value, and could be any other predetermined value appropriate for a particular implementation. Further, the presence of the flag can be used to invoke additional/alternative actions other than the insertion of a predetermined value if desired. For example, one could take an exception or abort execution if the presence of a zero length segment is unexpected and is symptomatic of errors in the generation of the input data.

Figure 5A:
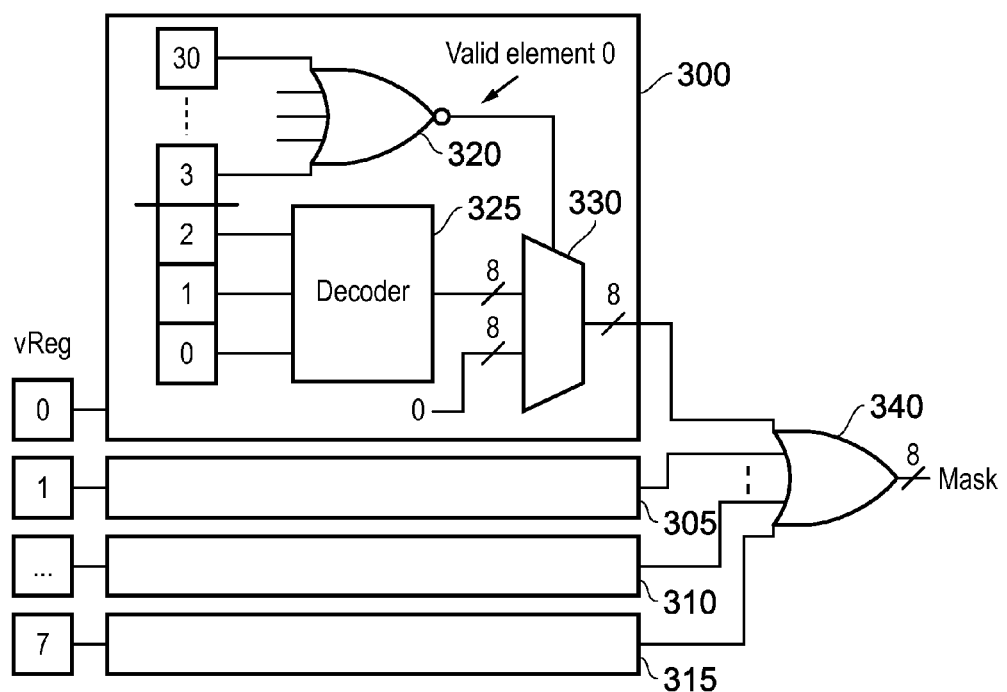
FIG. 5A illustrates components provided within the compute descriptor unit 150 in accordance with one embodiment in order to generate the per lane predicate information.

FIG. 5A illustrates components that may be provided within the compute descriptor unit 150 of FIG. 3 in accordance with one embodiment in order to generate a mask from the input operand of descriptor elements. As shown in FIG. 5A, it is assumed that the vector operand contains eight descriptor elements (labelled as descriptor elements 0 to 7, and the 32-bit unsigned value of each descriptor element is input to a corresponding circuit block 300, 305, 310, 315. Given the eight lanes of parallel processing, then only the lowest three significant bits of each 32-bit unsigned value need to be reviewed by the decoder block 325 within each of the circuits 300, 305, 310, 315. Based on those three bits, the decoder outputs an 8-bit mask value, which has at most one of the bits set to identify a segment end location indicated by the value of those lowest three significant bits.

In addition, the remaining bits 3 to 30 are passed through a NOR gate which will produce a logic one value whenever all of those bits are set to zero. In particular, this will indicate that the output from the decoder is valid since the 32-bit unsigned value lies in the range 0 to 7, and accordingly identifies a segment boundary within the current eight lanes of parallel processing.

A logic one value output from the NOR gate 320 will cause the output from the decoder 325 to be output from the multiplexer 330. However, whenever any of bits 3 to 30 of the descriptor element are set, this will cause a logic zero value to be output from the NOR gate 320, and cause the multiplexer 330 to select a default mask containing eight logic zero values as its output.

All of the masks generated by the various circuit blocks 300, 305, 310, 315 are then subjected to a logical OR operation using the OR gate 340 in order to generate the mask that is then used when performing the segmented scan operation.

Figure 5B:
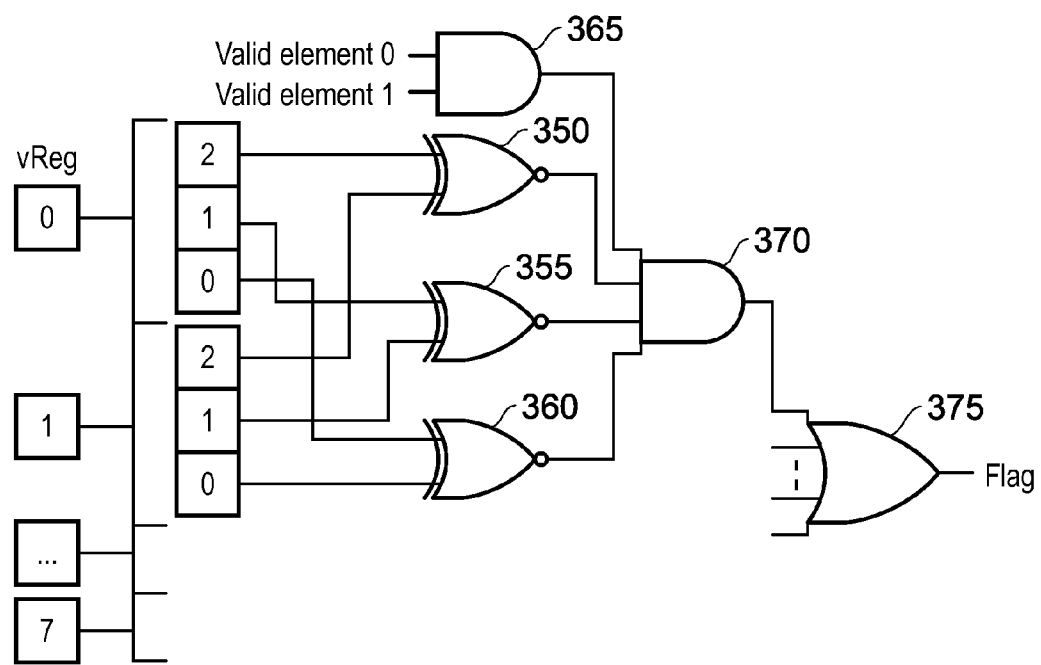
FIG. 5B illustrates components provided within the compute descriptor unit 150 in accordance with one embodiment in order to generate the optional flag.

FIG. 5B illustrates circuitry that may be provided within the compute descriptor unit 150 in order to optionally set a flag in situations where adjacent segment descriptors have the same value. In particular, circuitry is shown for comparing the first two descriptors in the input vector operand of segment descriptors, but it will be appreciated that the same circuitry can be replicated for each of the other adjacent pairs of segment descriptors. Only the lowest three significant bits need to be compared, and the corresponding bits from the pair of segment descriptors are input to associated XNOR gates 350, 355, 360. As will be understood, each XNOR gate will only output a logic one value if both of its inputs are identical. If all three outputs from the XNOR gates 350, 355, 360 are at a logic 1 value, then this means that the lowest three significant bits of both segment descriptors being compared are identical. The valid element information generated by the associated mask generation circuitry of FIG. 5A for the two segment descriptors under consideration are passed through a NAND gate 365 in order to generate a qualifying signal that is then input to the AND gate 370 along with the outputs from the XNOR gates. Accordingly, it will be appreciated that if the lowest three significant bits of both segment descriptors are the same, and for both segment descriptors a valid element signal has been generated, then the output from the AND gate 370 will be at a logic one value. For all other instances, it will be at a logic zero value. The outputs from each of the circuits used to evaluate adjacent pairs of segment descriptors are then input to an OR gate 375, with the flag then being set if any of those circuits produces a logic one output from their AND gate 370.

It should be noted that in the examples of FIGS. 5A and 5B, it is assumed that all eight lanes of parallel processing are used to process a data element during each iteration. However, in an alternative embodiment, per lane predication may be provided so as to enable the number of active data elements considered by the instruction to be limited, such that the input vector contains less than eight valid data elements. In such instances, it will be appreciated that additional components will be needed to utilise the predicate information in order to disable certain inputs to the OR gates 340, 375 when generating the masks and flags. This technique can be used, for example, to modify segment boundaries (dynamically) when dealing with adaptive algorithms.

Figure 6:
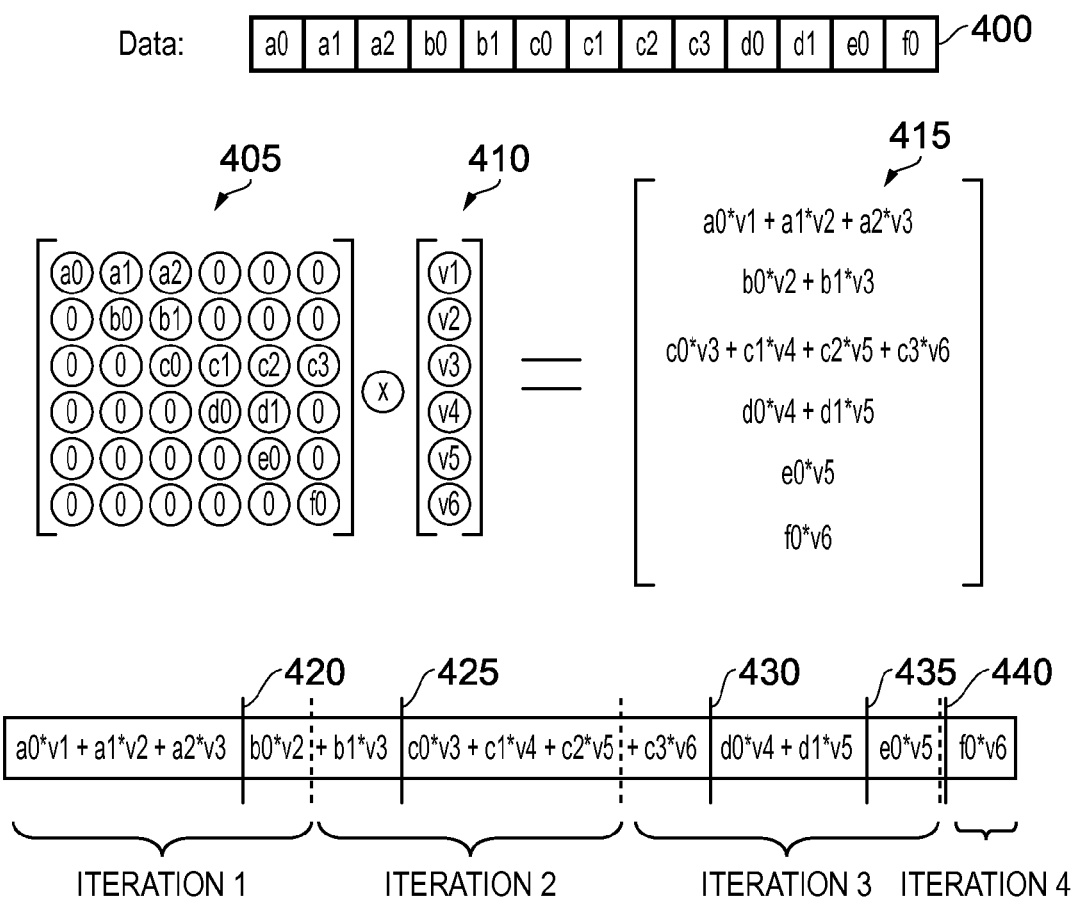
FIG. 6 schematically illustrates how sparse matrix multiplication may be performed using the apparatus of FIG. 3, in accordance with one embodiment.

FIG. 6 illustrates an example of an algorithm that may employ the segmented operations of the described embodiments. In particular, FIG. 6 illustrates a sparse matrix multiplication algorithm where an array of data elements 405 are multiplied by a vector 410 in order to generate the results 415. In particular, for each row of the matrix 405, the active data elements in that row are multiplied by the corresponding vector elements in the vector 410, with the multiplication results then being accumulated in order to produce one result for each row. Within memory, the data forming the array 405 may be represented as a series of data values 400. It should be noted that typically the logic zero values are not explicitly stored in memory (for example when using the Yale format for sparse matrices).

When using the segmented operation approach of the described embodiments, all of the vector multiply operations will be performed in order to produce as a set of data elements for the segmented operation the various multiplication results contained with block 415. However, at this stage, no accumulation of those results has taken place. Instead, the accumulation can take place via multiple iterations of a compute descriptor instruction and associated segmented instruction.

In the example shown in FIG. 6, it is assumed that the vector processing circuitry provides four lanes of parallel processing, and accordingly up to four data elements can be input to the vector processing circuitry in each iteration. How the data elements are consumed in each iteration is shown schematically in the lower half of FIG. 6, with the dotted vertical lines illustrating how the data elements are divided up into blocks of four data elements, and with the solid vertical lines 420, 425, 430, 435, 440 identifying the segment boundaries that need to be identified. Accordingly, during iteration one, a compute descriptor instruction will be executed in order to identify the segment boundary 420, and the vector processing circuitry will then perform a segmented operation in order to generate for the first segment an accumulation of the data elements in the first three lanes. The data element in the fourth lane will then pass through unamended, and be output as a scalar carry-out value for input as a scalar carry-in value into the next iteration. In the next iteration, performance of the compute descriptor instruction will identify the segment boundary 425. Accordingly, during this iteration of the segmented operation, the first lane's data element will be added to the scalar carry-in value formed by the scalar carry-out value from the first iteration in order to generate a result for the second segment. Further, the data elements in the second, third and fourth lanes will be accumulated together to produce a result which is then passed as a scalar carry-out value for use as a scalar carry-in value in the third iteration.

In the third iteration, execution of the compute descriptor instruction will identify the three segment boundaries 430, 435, 440. Hence, during performance of the segmented operation, the data element in the first lane will be added to the scalar carry-in value to generate a result for the third segment, and separately the data elements in lanes two and three will be added together to generate a result for the fourth segment. The data element in the fourth lane will pass through unamended and from a result for the fifth segment; there will then be no scalar carry-out value for this iteration.

Finally, in the fourth iteration, there will be only one active data element, which will be passed through unamended to form the result for the sixth segment.

As a result, it will be appreciated that each of the six accumulation results collectively referred to by the reference numeral 415 will have been generated using only four iterations through the vector processing circuitry.

Figure 7:
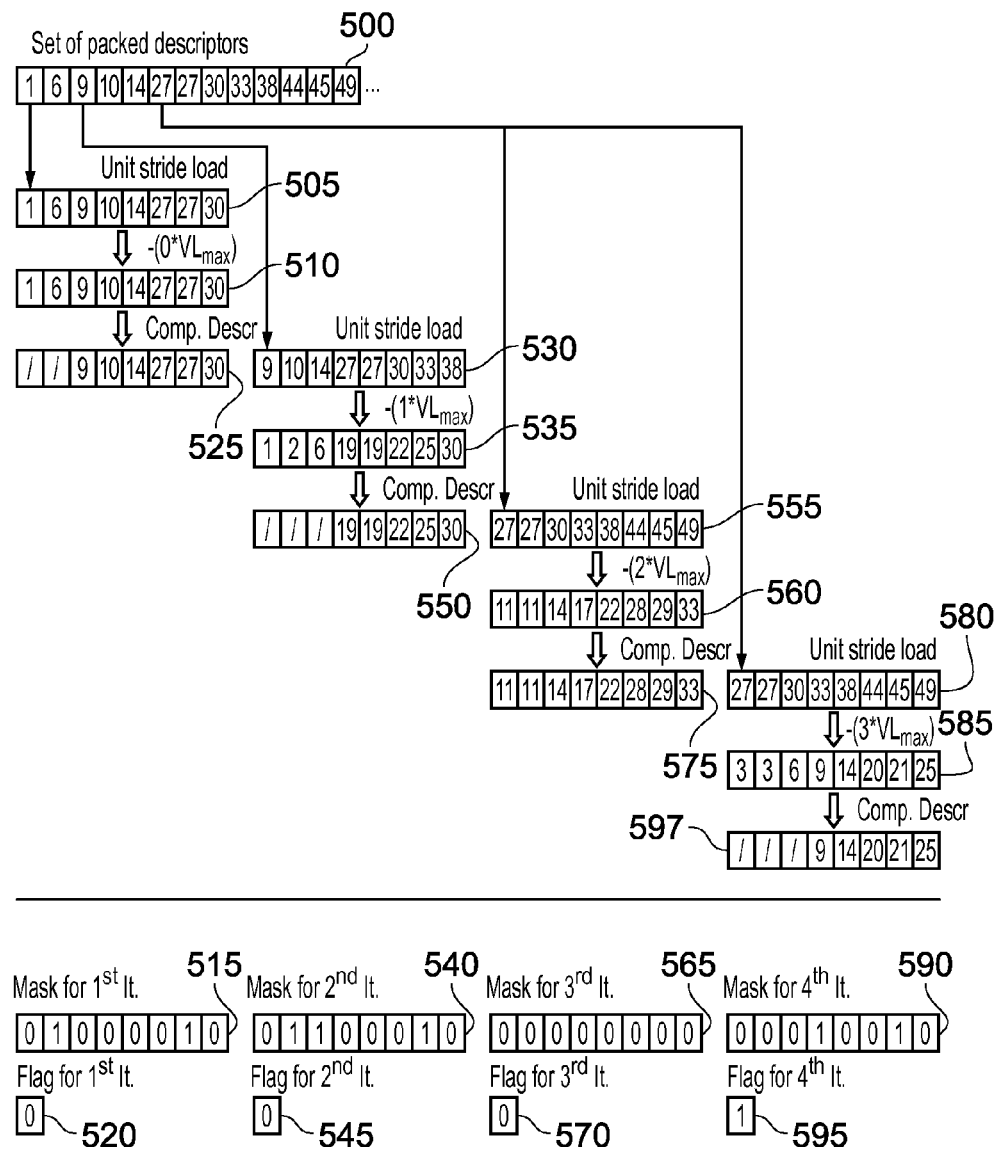
FIG. 7 schematically illustrates how a set of packed descriptors are used during multiple iterations to generate per lane predicate information and a flag for each of those iterations, in accordance with one embodiment.

FIG. 7 illustrates how a set of packed descriptors 500 are used during multiple iterations in order to create the required masks and flag values for each iteration. During a first iteration, a unit stride load operation is performed in order to load into the input vector operand 505 a series of eight segment descriptors from the set of packed descriptors 500 stored in memory. A subtraction operation is then used to subtract from the values of those segment descriptors the total number of data elements processed by any preceding iteration. During a first iteration, no data elements will have been previously processed, and accordingly no adjustment is made during this process, resulting in the vector operand 510 being unchanged with regard to the vector operand 505. The compute descriptor instruction is then executed in order to generate the mask 515 and the flag 520. This process was discussed earlier with reference to FIG. 1. As a result of this process, the first two segment descriptors "1" and "6" have been used, and accordingly a pointer is updated to indicate that fact, as indicated by the reference numeral 525.

Accordingly, during the second iteration, the unit stride load loads in eight further descriptors 530 from the set 500, starting with the third descriptor "9". During the previous iteration, it is assumed that eight data elements were processed using the mask 515, and accordingly the value 8 is subtracted from each of the segment descriptors, to give rise to the modified operand 535. That modified operand is then used by the compute descriptor instruction to generate the mask 540 and associated flag 545. As can be seen from FIG. 7, the first three segment descriptors are used during this process, and this results in the pointer being updated to exclude those three segment descriptors from further consideration, as indicated by the reference numeral 550. It should be noted that the subtraction performed to convert the operand 530 into the revised operand 535 could be performed by a separate instruction prior to the compute descriptor instruction being executed. In that event, the vector register identified by the compute descriptor instruction will already contain the revised segment descriptors 535. Alternatively, the compute descriptor instruction may itself perform the subtraction once it has obtained the input segment descriptors 530 from the specified vector register.

In the third iteration, the series of segment descriptors 555 are loaded into a vector register, and then a subtraction of two times the vector length is performed in order to subtract 16 from each of the segment descriptor values, to produce the modified input vector operand 560. In this case, each of the segment descriptor values is higher than the vector length, and accordingly all bits in the mask 565 are cleared. The flag 570 remains at a logic zero value. The vector processing circuitry then performs a full width operation on the supplied eight data elements for the third iteration, since all of those data elements are contained within the same segment. Since no segment descriptors were used, then the pointer is not updated, as indicated by the reference numeral 575.

Accordingly, in the fourth iteration, the same set of eight segment descriptors are loaded into the input operand register 580, but this time a value of 24 is subtracted (due to the previous three iterations each working on eight data elements). This results in the modified input vector operand 585. Once the compute descriptor instruction is executed using that modified vector operand, this results in the mask 590 being generated. In addition, since two of the used segment descriptors have the same value, the flag 595 is set.

The above described process can then be repeated for each of the remaining packed descriptors until all of the data elements have been processed.

Whilst for ease of illustration, it is assumed in FIG. 7 that the descriptors are reloaded on each iteration, the need for repeated loads from memory can be avoided, and instead the load operations can be modified so as to only load in additional segment descriptors required to replace the segment descriptors that have been consumed in the previous iteration.

Figure 8:
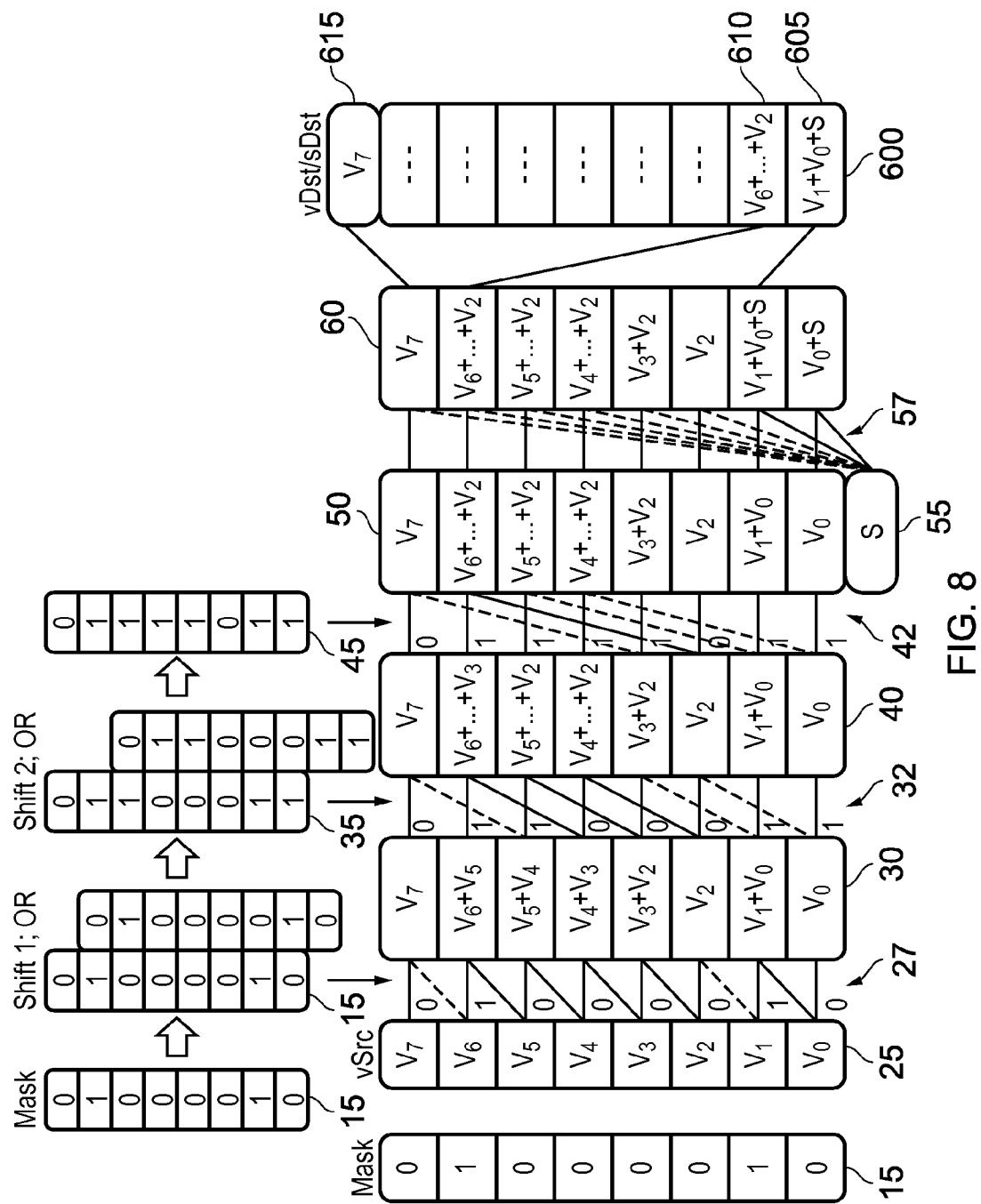
FIG. 8 illustrates how the per lane predicate information may be used to perform a segmented reduction operation in accordance with one embodiment.

Whilst in FIG. 2 a segmented scan operation was performed, in an alternative embodiment a segmented reduction operation is performed, as shown in FIG. 8. As can be seen from a comparison of FIG. 8 with FIG. 2, the masks are generated and used in the same way, but at the end of the operation, only the value in the uppermost lane of each segment is retained. Accordingly, for the first segment, the result $v_1+v_0+s$ is saved in the first element position 605 of the result vector 600. Similarly, the result $v_6+v_5+v_4+v_3+v_2$ is stored in the second element position 610. The content of the final lane, namely $v_7$, is output in the scalar carry-out value 615, for use in a subsequent iteration. Whilst for ease of illustration the segmented reduction operation is shown as performing all of the intervening accumulation operations, consistent with the segmented scan operation, it will be appreciated that not all of those intermediate computations need to be performed.

When moving the results in accordance with the final steps shown in FIG. 8, all of the lanes containing results that are not required can be deactivated using predication. Further, the carry value is only maintained if the uppermost lane does not represent the final lane of a particular segment. If instead the last segment identified by the compute descriptor instruction was completed, the carry value will be set equal to a neutral value to identify that there is no carry value.

Figure 9:
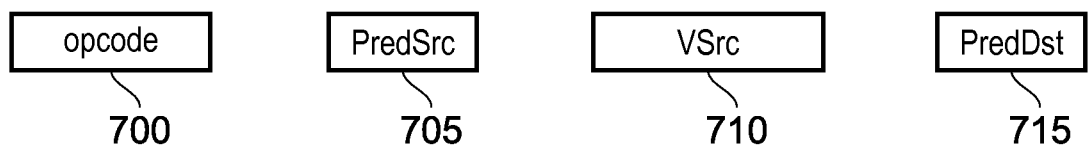
FIG. 9 schematically illustrates fields provided within a compute descriptor instruction in accordance with one embodiment.

FIG. 9 is a diagram schematically illustrating fields provided within the compute descriptor instruction in accordance with one embodiment. The opcode 700 identifies that the instruction is a compute descriptor instruction. The predicate source field 705 is an optional field that may be used to exclude certain segment descriptors from consideration. The vector source field 710 identifies a vector register containing a plurality of segment descriptors, for example eight segment descriptors using the earlier example. The predicate destination register 715 identifies a predicate register within the predicate register file 155 into which the mask generated by the compute descriptor operation is to be stored.

Figure 10:
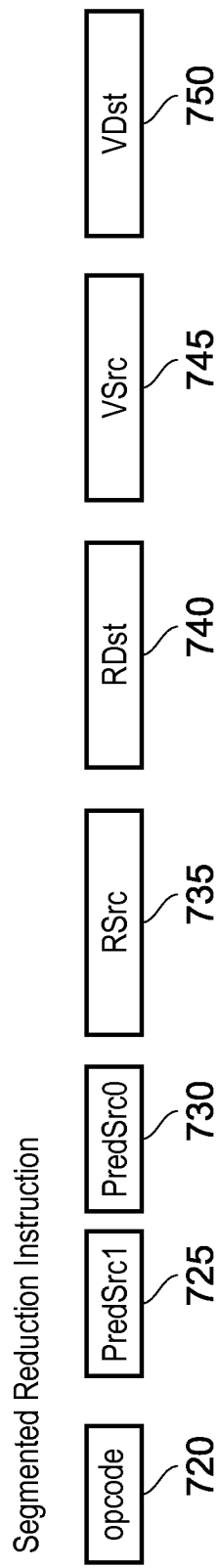
FIG. 10 schematically illustrates fields provided within a segmented reduction instruction in accordance with one embodiment.

FIG. 10 is a diagram schematically illustrating fields provided within the segmented reduction instruction (or indeed a segmented scan instruction) in accordance with one embodiment. The opcode 720 identifies that the instruction is a segmented reduction (or scan) instruction. The predicate source zero field 730 identifies the predicate register in which the mask generated by the previously executed compute descriptor instruction is stored. The predicate source one field 725 is an optional field that allows further predicate information to be identified to disable one or more lanes of parallel processing within the vector processing circuitry. The field 735 identifies a scalar register containing a scalar carry-in value, whilst the field 740 identifies a destination register into which the scalar carry-out value is to be stored. In one embodiment, these two registers can be set to be the same register, thereby freeing up certain encoding space within the instruction.

Finally, the field 745 identifies a vector source register containing the source data elements to be processed by the segmented instruction, and similarly the field 750 identifies a destination register into which the results are to be stored. As with the scalar source and destination registers, these vector source and destination registers can be set to be the same register, thereby saving encoding space within the instruction. Furthermore, the contents of the two predicate source fields 725, 730 can be merged into a single predicate mask prior to issuing the segmented reduction instruction. For example, the mask produced by execution of the compute descriptor instruction may be logically ANDed with another predicate mask to generate a revised mask which is then stored within one of the predicate registers, and it is that revised mask that is then referred to by the segmented reduction instruction.

Figure 11:
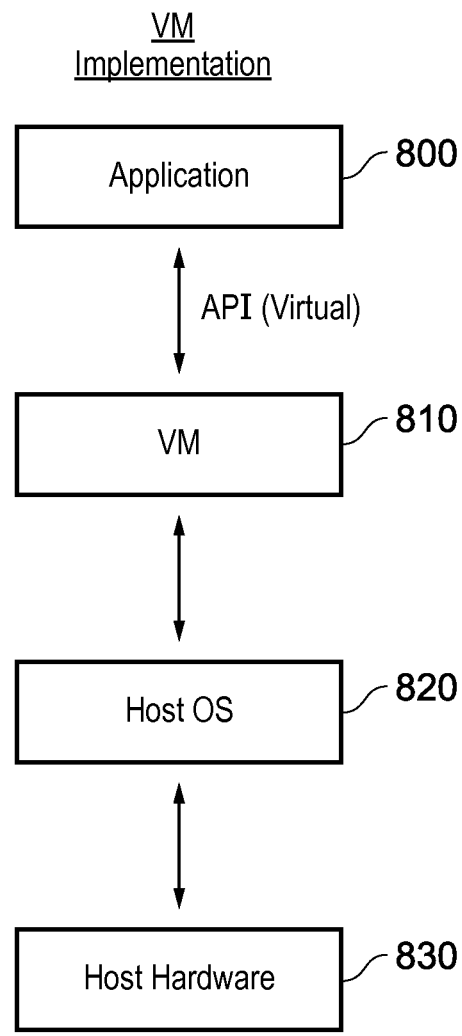
FIG. 11 schematically illustrates a virtual machine implementation of the data processing apparatus in accordance with one embodiment.

FIG. 11 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 830 typically running a host operating system 820 supporting a virtual machine program 810. Often, large powerful processors are required to provide virtual machine implementations which execute at a reasonable speed, but such an approach may be justified in certain circumstances, such as when there is a desire to run code native to another processor for compatibility or re-use reasons. The virtual machine program 810 is capable of executing an application program (or operating system) 800 to give the same results as would be given by execution of the program by such a real hardware device. Thus, the program instructions, including the compute descriptor and segmented instructions described above, may be executed from within the application program 800 using the virtual machine program 810.

As will be apparent from the above discussion, the use of a compute descriptor instruction enables per lane predicate information to be generated enabling segmented operations to be performed within a vector processing circuitry providing N lanes of parallel processing. In particular, through use of the per lane predicate information, better utilisation of the lanes of parallel processing of the vector processing circuitry can be achieved, allowing certain operations to be performed more efficiently within SIMD data paths. There are a wide variety of operations that can benefit from such an approach, one example being algorithms based on nested loops, where the various identified segments may contain data elements associated with each iteration of a predetermined loop within a nested loop. Whilst sparse matrix multiplication was given as one example of an algorithm that can benefit from the described segmented operation approach, it will be appreciated that there are many other algorithms that could also similarly be performed more efficiently within a SIMD data path using such a segmented operation approach.

Whilst in one embodiment, each of the segment descriptors within the input vector operand of the compute descriptor instruction use a pointer representation, i.e. each value indicates the end of a segment, in an alternative approach each of the segment descriptors could identify the length of a segment, with the end of a current segment being calculated based on an offset from the previous segment.

The output mask generated by the compute descriptor instruction may be stored in a dedicated vector mask register, or in an alternative embodiment, as discussed with reference to FIG. 3, can be stored within an identified predicate register within a predicate register file 155. In a further alternative embodiment, a vector register could be used to store the masks for multiple iterations, such that each vector element within the vector register identifies one of the masks. As a further alternative, a scalar register could be used to store each mask, with each bit of the mask representing the mask value (0 or 1) for a corresponding data element of the vector operand to be processed by the segmented operation.

Further, whilst in the described embodiments, a logic one value is used to identify the end of a segment within the mask (it being found that this format is particularly suited to propagating values between multiple segmented instructions), in alternative embodiments a logic one value may be used to mark the beginning of a segment, or adjacent segments could be distinguished from each other by using a sequence of ones (for a first segment) alternating with a sequence of zeros (for a second segment), and then a further sequence of ones (for a third segment), etc.

As previously discussed, the setting and clearing of a flag value is optional. Whilst in the described embodiments, adjacent segment descriptors are compared when deciding whether to set the flag, the technique does not need to be limited to a review of consecutive segment descriptors, and instead in an alternative embodiment all segment descriptors within a particular input operand could be compared with each other when deciding whether to set the flag. A dedicated flag may be introduced to store the flag value, or alternatively it may be possible to re-use an existing flag (for example a carry flag).

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus comprising:
   a vector register store configured to store vector operands;
   vector processing circuitry providing N lanes of parallel processing, and configured to perform a segmented operation on up to N data elements provided by a specified vector operand, each data element being allocated to one of said N lanes, said up to N data elements forming a plurality of segments, and performance of the segmented operation comprising performing a separate operation on the data elements of each segment, said separate operation involving interaction between the lanes containing the data elements of the associated segment; and
   predicate generation circuitry configured to be responsive to a compute descriptor instruction specifying an input vector operand comprising a plurality of segment descriptors, to generate per lane predicate information used by the vector processing circuitry when performing said segmented operation to maintain a boundary between each of said plurality of segments, in order to prevent interaction between lanes containing data elements from different segments.

2. A data processing apparatus as claimed in claim 1, wherein said vector processing circuitry comprises multiple pipelined stages, and is configured to employ said per lane predicate information to control computations performed in each of said multiple pipelined stages in order to maintain said boundary between each of said plurality of segments.

3. A data processing apparatus as claimed in claim 2, wherein at each pipelined stage the vector processing circuitry is configured to selectively disable one or more computations in dependence on said per lane predicate information in order to prevent interaction between lanes containing data elements from different segments.

4. A data processing apparatus as claimed in claim 3, wherein for each of one or more of the pipelined stages, the vector processing circuitry is configured to perform a logical operation on the per lane predicate information in order to produce control data to identify which computations are to be disabled at that pipelined stage.

5. A data processing apparatus as claimed in claim 1, wherein said per lane predicate information comprises a binary value for each lane.

6. A data processing apparatus as claimed in claim 5, wherein said binary value is set to a first value to identify each lane allocated a final data element of a segment, and is set to a second value for all other lanes.

7. A data processing apparatus as claimed in claim 5, wherein said binary value is set to a first value to identify lanes containing data elements of one segment, and is set to a second value to identify lanes containing data elements of an adjacent segment.

8. A data processing apparatus as claimed in claim 1, wherein the predicate generation circuitry is further configured to set a control field if the plurality of segment descriptors indicates presence of at least one segment having no data elements.

9. A data processing apparatus as claimed in claim 8, wherein the vector processing circuitry is responsive to said control field being set to perform an additional processing step in association with said segmented operation.

10. A data processing apparatus as claimed in claim 9, wherein said additional processing step comprises identifying from the plurality of segment descriptors a location of each segment having no data elements, and inserting a predetermined data value at that location within result data generated by the segmented operation.

11. A data processing apparatus as claimed in claim 1, wherein the segmented operation further specifies a scalar carry-in value, and performance of the segmented operation produces a vector of result data elements and a scalar carry-out value.

12. A data processing apparatus as claimed in claim 11, wherein the vector processing circuitry is responsive to a segmented instruction to perform said segmented operation, and the data processing apparatus is configured to execute a plurality of iterations of the compute descriptor instruction and the segmented instruction to perform the segmented operation on a set of data elements comprising more than N data elements, the scalar carry-out value produced by performance of the segmented operation for one iteration being used as the scalar carry-in value for performance of the segmented operation in a next iteration.

13. A data processing apparatus as claimed in claim 1, wherein the vector processing circuitry is responsive to a segmented instruction to perform said segmented operation, and the data processing apparatus is configured to execute a plurality of iterations of the compute descriptor instruction and the segmented instruction to perform the segmented operation on a set of data elements comprising more than N data elements, said set of data elements comprising a plurality of segments.

14. A data processing apparatus as claimed in claim 13, wherein the number of data elements in each of the segments is irregular.

15. A data processing apparatus as claimed in claim 13, wherein the segments identify data elements associated with each iteration of a predetermined loop within a nested loop.

16. A data processing apparatus as claimed in claim 13, wherein the vector processing circuitry is configured to perform a sparse matrix multiplication operation where a sparse matrix of first data elements is multiplied by a vector of second vector elements to produce a number of multiplication results for each row of the sparse matrix, said multiplication results forming said set of data elements upon which the segmented operation is performed, where each segment comprises the multiplication results for one of said rows of the sparse matrix.

17. A data processing apparatus as claimed in claim 16, wherein the segmented operation performs an accumulation operation on the multiplication results within each segment.

18. A data processing apparatus as claimed in claim 1, wherein said segment descriptors provide a pointer to one of an end of each segment and a beginning of each segment.

19. A data processing apparatus as claimed in claim 1, wherein said segment descriptors identify a length of each segment.

20. A data processing apparatus as claimed in claim 1, wherein said plurality of segment descriptors comprise signed integers.

21. A data processing apparatus as claimed in claim 13, wherein:
   said plurality of segment descriptors comprise signed integers; and
   on each iteration the input vector operand is updated to remove any segment descriptors used during a preceding iteration to generate the per lane predicate information for the preceding iteration.

22. A data processing apparatus as claimed in claim 21, wherein the predicate generation circuitry is configured, prior to generating the per lane predicate information for a current iteration, to subtract from the plurality of segment descriptors provided for the current iteration, a value equal to the total number of data elements processed by all preceding iterations.

23. A data processing apparatus as claimed in claim 1, wherein said segmented operation is one of a segmented scan operation and a segmented reduction operation.

24. A data processing apparatus as claimed in claim 1, further comprising a predicate register file providing a plurality of predicate registers, and said compute descriptor instruction is configured to specify one of said predicate registers into which the per lane predicate information is to be stored.

25. A method of performing segmented operations within a data processing apparatus having a vector register store configured to store vector operands, and vector processing circuitry providing N lanes of parallel processing, the method comprising:
   performing within the vector processing circuitry a segmented operation on up to N data elements provided by a specified vector operand, each data element being allocated to one of said N lanes, said up to N data elements forming a plurality of segments, and performance of the segmented operation comprising performing a separate operation on the data elements of each segment, said separate operation involving interaction between the lanes containing the data elements of the associated segment; and
   responsive to a compute descriptor instruction specifying an input vector operand comprising a plurality of segment descriptors, generating per lane predicate information used by the vector processing circuitry when performing said segmented operation to maintain a boundary between each of said plurality of segments, in order to prevent interaction between lanes containing data elements from different segments.

26. A data processing apparatus comprising:
   a vector register store means for storing vector operands;
   vector processing means for providing N lanes of parallel processing, and for performing a segmented operation on up to N data elements provided by a specified vector operand, each data element being allocated to one of said N lanes, said up to N data elements forming a plurality of segments, and performance of the segmented operation comprising performing a separate operation on the data elements of each segment, said separate operation involving interaction between the lanes containing the data elements of the associated segment; and
   predicate generation means for generating, in response to a compute descriptor instruction specifying an input vector operand comprising a plurality of segment descriptors, per lane predicate information used by the vector processing means when performing said segmented operation to maintain a boundary between each of said plurality of segments, in order to prevent interaction between lanes containing data elements from different segments.

27. A computer program product storing in a non-transitory form a computer program for controlling a computer to provide a virtual machine execution environment for program instructions corresponding to a data processing apparatus as claimed in claim 1.

* * * * *